United States Patent [19]

Yamashita

[11] Patent Number: 5,136,442
[45] Date of Patent: Aug. 4, 1992

[54] CASSETTE LOADING DEVICE OF A TAPE PLAYER UTILIZING POWER FROM CAPSTAN MOTOR

[75] Inventor: Tatsumaro Yamashita, Shibata, Japan

[73] Assignee: Alps Electric Co., Ltd., Tokyo, Japan

[21] Appl. No.: 814,258

[22] Filed: Dec. 23, 1991

Related U.S. Application Data

[63] Continuation of Ser. No. 484,585, Feb. 23, 1990, abandoned.

[30] Foreign Application Priority Data

Mar. 6, 1989 [JP] Japan ................ 1-25969[U]

[51] Int. Cl.⁵ .......................................... G11B 15/675
[52] U.S. Cl. ...................................... 360/96.5; 360/93
[58] Field of Search ................ 360/96.5, 95, 85, 71, 360/96.1

[56] References Cited

U.S. PATENT DOCUMENTS

| | | | |
|---|---|---|---|
| 4,704,643 | 11/1987 | Matsuoka et al. | 360/71 |
| 4,723,177 | 2/1988 | Ahn | 360/96.5 |
| 4,884,153 | 11/1989 | Ahn | 360/85 |
| 4,930,720 | 6/1990 | Hwang | 360/96.5 |

Primary Examiner—John H. Wolff
Assistant Examiner—Craig A. Renner
Attorney, Agent, or Firm—Guy W. Shoup; David W. Heid; B. Noel Kivlin

[57] ABSTRACT

A cassette loading device of a tape player is equipped with a motor driving capstan and a pinch roller for pressing the tape against the capstan. The power of the capstan motor is transmitted to a power transmission rotator through a driving gear and a clutch gear. The rotating force of the power transmission rotator is then transmitted to the cassette holder driving section through a speed reduction mechanism. Therefore, the cassette holder can be moved and the load or eject of the cassette can be done without complicated motion timing and application of motor for special purpose.

2 Claims, 3 Drawing Sheets

CASSETTE LOADING DEVICE OF A TAPE PLAYER UTILIZING POWER FROM CAPSTAN MOTOR

This application is a continuation of application Ser. No. 07/484,585, filed Feb. 23, 1990 now abandoned.

BACKGROUND OF THE INVENTION

1. Field of the Invention

This invention is related to a cassette loading device in which the cassette holder is movable and wherein a cassette is loaded to the tape driving position when the cassette is being loaded into the cassette holder. Particularly, this invention is related to cassette loading devices for tape players in which the cassette holder can be moved, as mentioned above, by means of the power of the same motor that drives the capstan.

2. Description of the Prior Art.

In typical rotating magnetic head tape players used in DAT(Digital Audio Tape recorder) and VTR (Video Tape Recorder) devices, when the cassette is being inserted to the cassette holder, in order into move the cassette holder to the tape driving position, a cassette loading device must be activated. In former tape players, in order to operate this cassette loading device and to move the cassette holder, an exclusive motor is energized. Alternatively, the motor used as the driving supply for the tape loading mechanism, which draws the tape out from the cassette and winds it on the rotating magnetic head device, is also used as the driving supply for the cassette loading device.

From the above-mentioned prior art examples, it can be observed that inclusion of either an exclusive motor used specifically for the cassette loading device or a common motor that also drives the tape loading mechanism, results in the disadvantages such as increasing of motor loading, increasing of the size of the machine set, increasing of weight and etc. In addition, when the motor used for the driving supply of the tape loading mechanism is also used for the driving supply of the cassette loading device, the set up of motor timing and the design of the power transmission mechanism becomes very complicated. In this condition, after the operation of the cassette insertion has been completed, the tape loading mechanism is driven but the cassette loading device is not driven. Moreover, while executing the ejection of the cassette, after the tape has been return back into the cassette by driving the tape loading mechanism, the tape loading mechanism is not operated and the cassette loading device must be rotated reversely to eject the cassette. In this way, the power converting and the driving timing set up of these two mechanisms becomes very difficult.

SUMMARY OF THE INVENTION

The above-mentioned problems have been resolved by the present invention. The object of the present invention is to provide a cassette loading device for a tape player in which load and eject operations of the cassette can be operated without application of motor for special purpose, and without application of complicated motion timing and mechanisms.

The cassette loading device according to the present invention possesses the following characteristics. In the tape player device equipped with motor driving capstan and pinch roller for pressing the tape against the capstan, a driving gear rotated by the motor is installed, which is used for driving the above-mentioned capstan. In the position parallel to this driving gear, a clutch gear and a power transmission rotator are installed. They are mounted independently of each other against a common shaft and are both supported on the common shaft. On the clutch gear and power transmission rotator, there are projections which can mesh with each other. A spring is also installed. When these projections are not in match to each other, the spring will keep the clutch gear separate from the power transmission rotator. Further, the above mentioned power transmission rotator moves together with the driving section of the cassette holder by the speed reduction mechanism. Because of the regular or reverse rotation of the power transmission rotator, the cassette holder can move between the position of cassette insert or eject and the position of tape driving. Still further, the above-mentioned clutch gear meshes with the above mentioned driving gear, and in order to let the clutch gear move along the shaft in meshing condition and in order to let the projections of the clutch gear and the power transmission rotator mesh with each other, a change component is installed.

In the above-mentioned method, the motor which drives the capstan is applied for the driving supply of the cassette loading device. Since the capstan is only used on recording or playing, and while the tape has not been pressed by the pinch roller, even if the capstan is rotating, there will not be any influence on other mechanisms. Thus, it is unnecessary to consider the problems about timing setup, and the driving of the cassette loading device becomes possible.

In above-mentioned method, because of the motion of the change component, the clutch gear is not moving along the direction of the power transmission rotator. If the capstan rotates, the clutch gear will be run idle due to the driving gear. If the clutch gear is moving along the direction of the power transmission rotator by means of the change component, the projections will mesh with each other, and the clutch gear will be rotating together with the power transmission rotator. Hereby, the power of the capstan driving motor is transmitted to the power transmission rotator through the driving gear and the clutch gear. Then, the rotating force of this power transmission rotator will be transmitted to the cassette holder driving section through the speed reduction mechanism. In this way, the cassette holder can be moved and the operation of the insert or eject of the cassette can be accomplished. In order to move the cassette holder, a very large driving torque is required. Because the clutch gear is always meshing with the driving gear, and the clutch gear is combined with the power transmission rotator into a unit through the matching of the projections, the transmission of very large driving torque becomes possible and the change of the power transmission is also reliable.

BRIEF DESCRIPTION OF THE DRAWINGS

The figures illustrate the embodiment of this design.

DETAILED DESCRIPTION OF THE PREFERRED EMBODIMENT

The preferred embodiment according to the present invention will be illustrated through the following figures.

Figure 1:
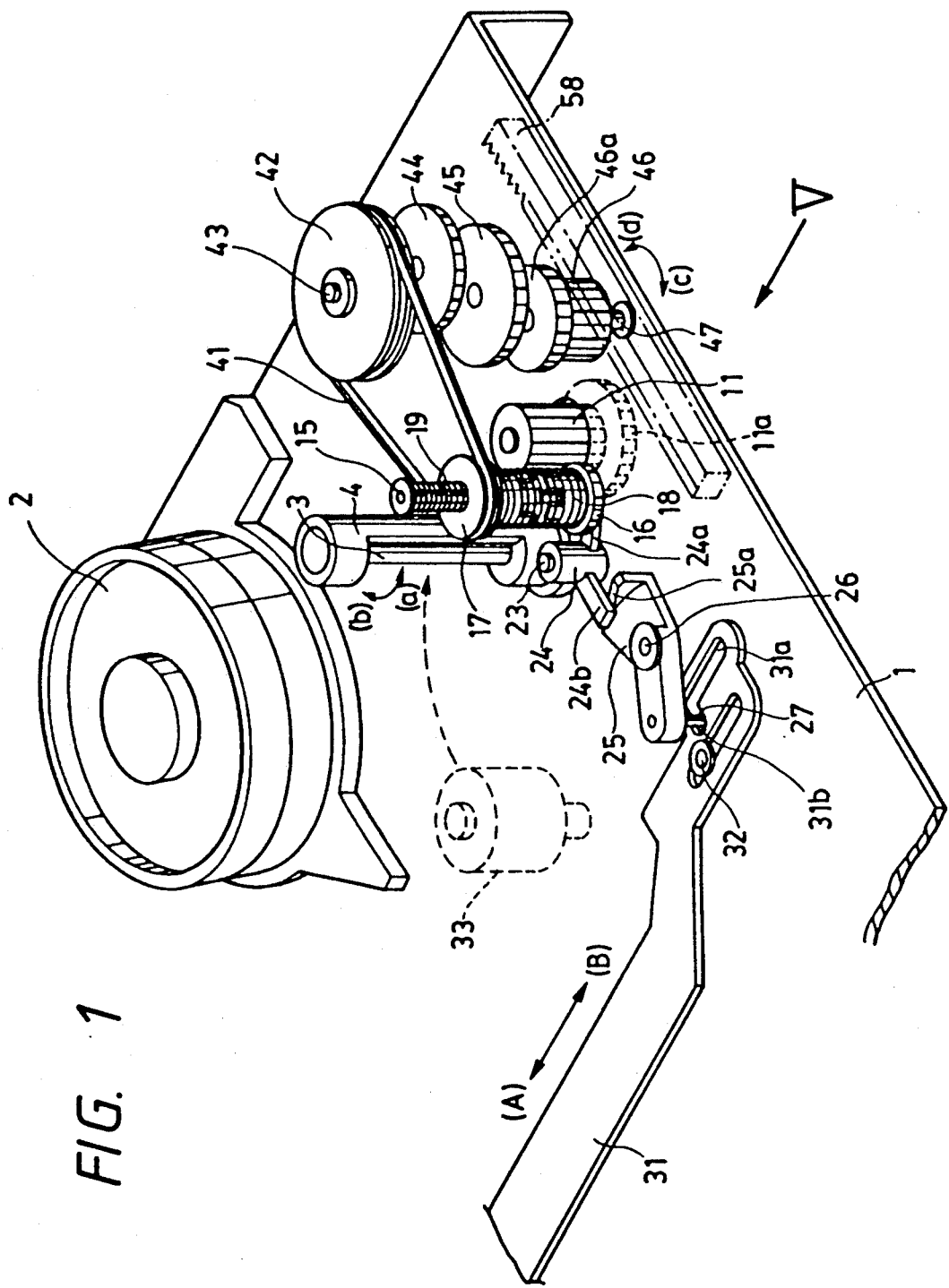
FIG. 1 is a schematic angular view showing the tape driving unit of tape player with rotating magnetic head.
Figure 2:
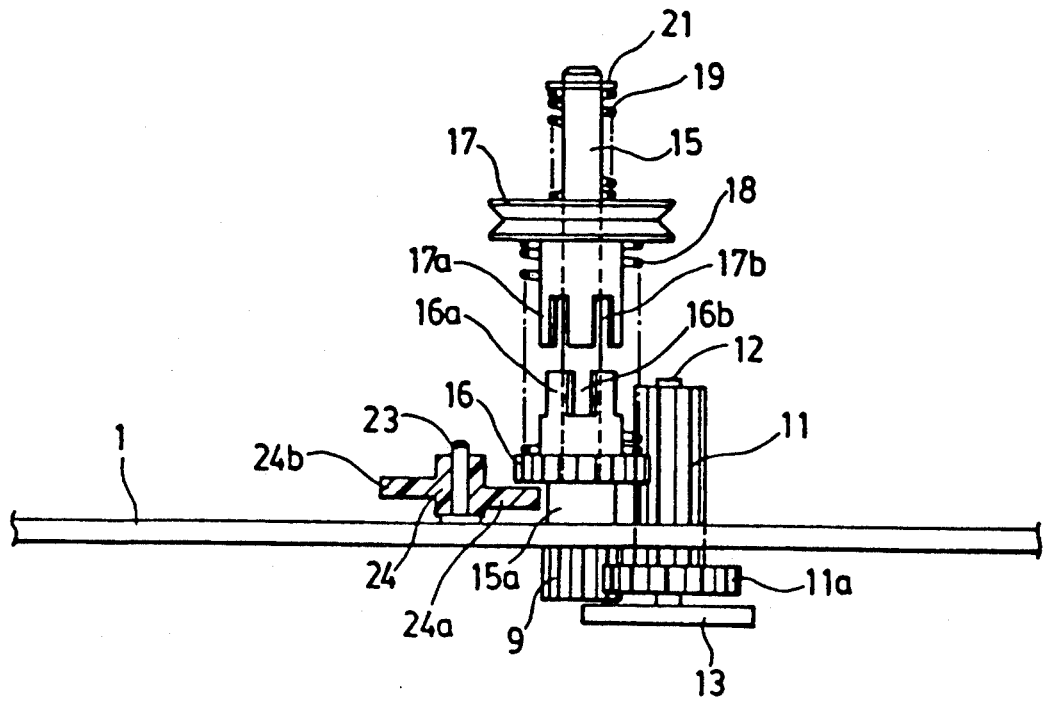
FIG. 2 is a schematic side view showing the clutch gear and the power transmission pulley.
Figure 3:
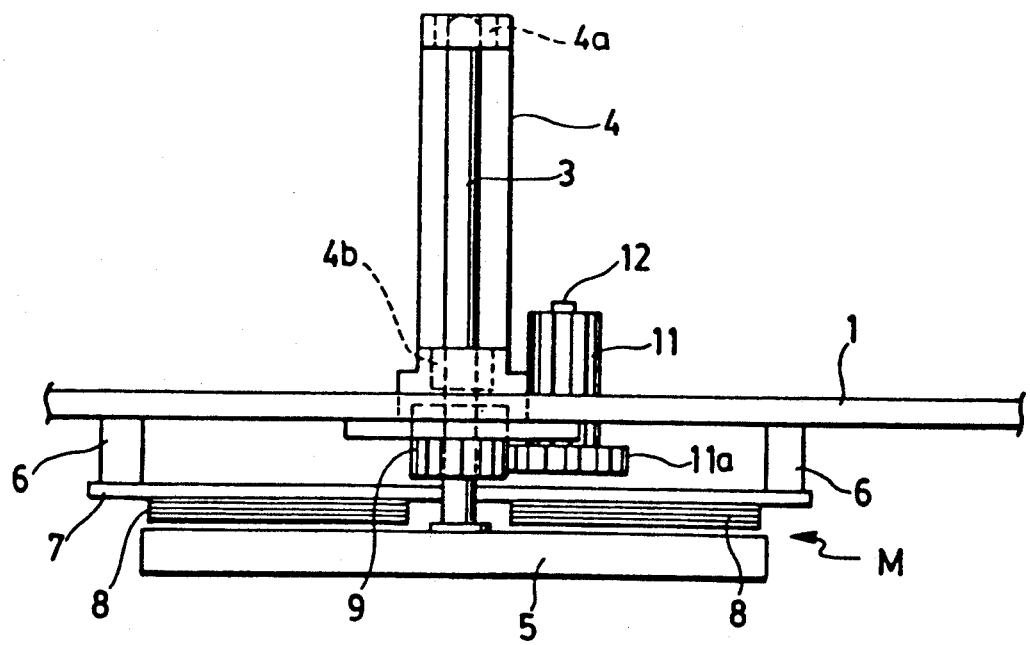
FIG. 3 is a schematic side view showing the relation between the capstan and the driving gear.
Figure 4:
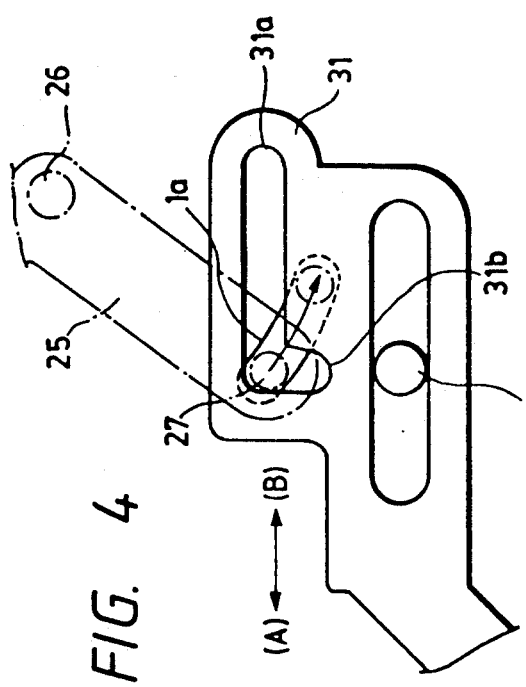
FIG. 4 is a schematic plan view showing the co-related section of the change lever and the rotation controlling lever.
Figure 5:
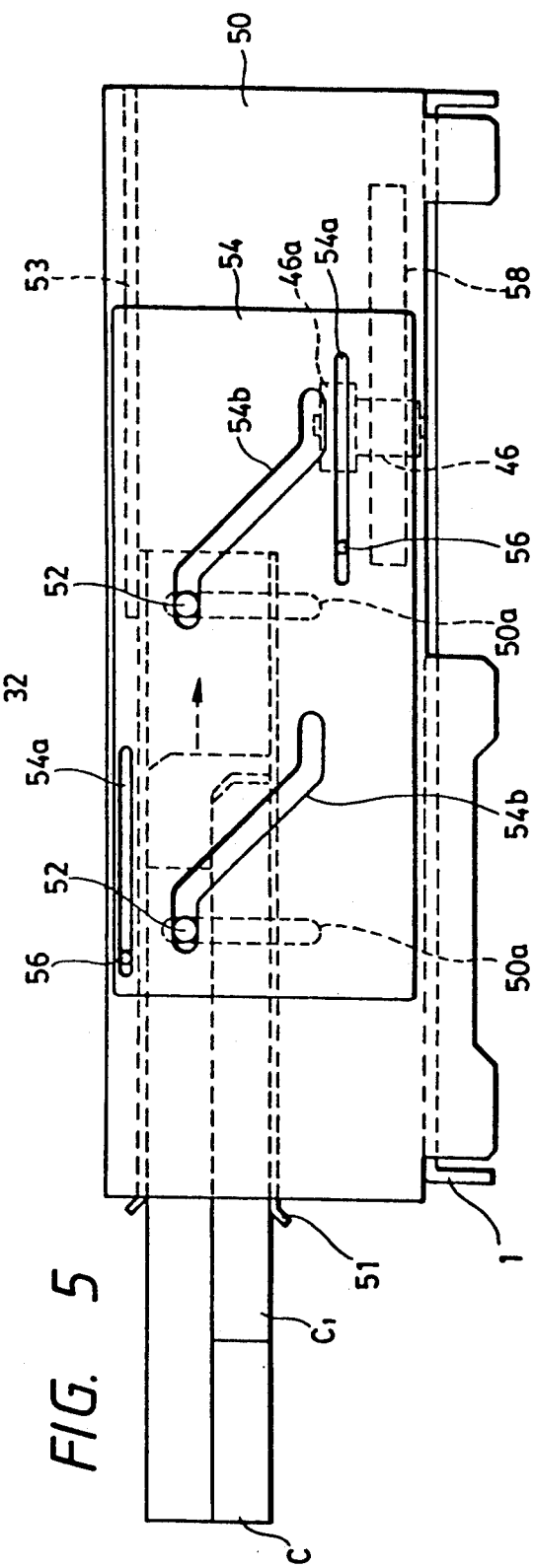
FIG. 5 is a schematic side view from v direction of FIG. 1 showing the side panel of the tape driving unit.

FIG. 1 is a schematic angular view which shows a part of the tape driving unit of a tape player with a rotating magnetic head. FIG. 2 is a schematic side view which shows the section of the clutch gear and the power transmission rotator. FIG. 3 is a schematic side view which shows the basic section of the capstan. FIG. 4 is a schematic plan view which shows the co-relating section of the change lever and the rotation controlling lever. FIG. 5 is a schematic side view which shows the driving mechanism of the cassette holder.

In FIG. 1, numeral 1 is the chassis of the tape driving unit. On the chassis 1, a rotating magnetic head device 2 is loaded. In addition, being omitted in the figure, the tape loading mechanism is mounted on the chassis 1. Once the cassette is loaded, by means of this tape loading mechanism, the tape in the cassette is drawn out and wound on the rotating magnetic head device 2, and moved to a position in contact with a capstan 3.

As shown in FIG. 3, the capstan 3 is mounted inside the housing 4. Through the bearing 4a, which is maintained on the top end of the housing 4, and the bearing 4b, which is maintained on its bottom end, the capstan 3 is supported and is able to rotate freely. The embodiment as shown in the figure describes the condition of direct driving. The capstan 3 is driven directly by motor M. As shown in FIG. 3, on the bottom end of the capstan 3, a rotor magnet 5 is mounted fixedly, and under the chassis 1, through the stud 6, a stator base 7 is fixedly mounted. On the stator base 7, a stator coil 8 is mounted. The brushless motor M is comprised of the stator coil 8 and the rotor magnet 5, and the capstan 3 is rotated by the power of this motor. Further, on the bottom end of the capstan 3, a gear 9 is fixedly mounted such that the gear 9 can be rotated together with the capstan 3.

The numeral 11 is the driving gear. A shaft 12, which supports the driving gear 11 and allows it to rotate freely, is supported by the sub chassis 13 (reference to FIG. 2) which is mounted below the chassis 1. The top of the chassis 4 which supports the capstan 3, the sub sub chassis 13 may be alternatively designed to combine with the top of housing 4 which supports capstan 3 as an integral unit and with the above-mentioned shaft 12 mounted on it. On the bottom end of the driving gear 11, a gear 11a, with a slightly larger diameter than the gear 11, is designed to combine with it as an integral unit. The gear 11a meshes with above-mentioned gear 9. When the capstan 3 is driven by the motor M, the power is transmitted from the gear 9 to the gear 11a, and hence the driving gear 11 is rotated together with the capstan 3 simultaneously.

As shown in FIG. 1, a slide axis 15 is fixedly mounted at the side of the capstan 3. The clutch gear 16 and the power transmission pulley 17 are supported by the slide axis 15. The clutch gear 16 and the power transmission pulley 17 can rotate independently on the slide axis 15 and can also slide separately along the axial direction of the slide axis 15. As shown in FIG. 2, in the clutch gear 16, a hub 15a stretching upward is formed. A projection 16a and a depression 16b are mutually formed on the upside of the hub 15a. Further, upside the power transmission pulley 17, a hub stretching downward is formed. A projection 17a and a depression 17b are mutually formed on the lower side this hub. According to the mechanism described in the following, if clutch gear 16 is raised, the projection 16a will match the depression 17b and the projection 17a will match the depression 16b respectively, and then, the clutch gear 16 and the power transmission pulley 17 rotate together as one unit. In addition, at the front part of the above mentioned projections 16a and 17a, no slope has been formed, and they are approximately rectangular. Due to these rectangular projections without slope, the projections 16a and 17a mesh with each other reliably. A coil spring 18 is mounted between the clutch gear 16 and the power transmission pulley 17, and thus the clutch gear 16 and the power transmission pulley 17 are biased by a spring force to separate them mutually. Through this spring force, the clutch gear 16 is tightly pressed upon the hub 15a which is mounted on the base section of slide axis 15. At the top end of the slide axis 15, a ring 21 is fixedly mounted. A spring 19 is mounted between the ring 21 and the power transmission pulley 17. Therefore, the power transmission pulley 17 is biased by the spring forces applied from both sides by above-mentioned springs 18 and 19.

On one side of the clutch gear 16, a pin 23 is fixed on the chassis 1. The pin 23 supports the change component 24 and allows it to slide freely. Meanwhile, an arm 24a is mounted on the change component 24 and is inserted below the clutch gear 16. When the change component 24 is raised, the clutch gear 16 is lifted by the arm 24a. Thus, the clutch gear 16 is in meshing state with the driving gear 11 and slides upward along the slide axis 15, and then the projection 16a which is mounted on the clutch gear 16 will match mutually with projection 17a which is mounted on the power transmission pulley 17. As shown in FIG. 1, at the side of the change component 24, a rotation control lever 25 is supported by the pin 26 and is allowed to rotate freely. On the rotation control lever 25 a slope 25a is formed. This slope 25a is positioned at the bottom section of the arm 24b, which is formed in another side of the change component 24. Therefore, when the rotation control lever 25 is driven to move counter clockwise, the arm 24b is lifted upward through the slope 25a, and then, the change component 24 is raised.

The above-mention rotation control lever 25 is driven by a change lever 31. The change lever 31 is supported by a guide pin 32, and as shown in FIG. 1, can slide freely along direction A—B. As shown in FIG. 4, at the right side end of the change lever 31, a long slot 31a is formed along its moving direction. At the left side end of the long slot 31a, a maintaining slot 31b is formed, and the resulting form is in an L shape.

At the bottom side of the change lever 31, an arc shape slot 1a is formed on the chassis 1. The slot 1a is center around the shaft 26, which is the rotating center of the rotating control lever 25, and is formed along an arc track with a certain diameter. A pin 27 is mounted on the above-mentioned rotation control lever 25. The pin 27 is inserted into the slot 1a and is mounted on the chassis through the long slot 31a of the change lever 31. The change lever 31 is driven to move along the above-mentioned A—B direction by the motor and is used to drive the tape loading mechanism. However, from the state as shown in FIG. 4, if moving along the B direction, the pin 27 is maintained through the slot 31b which is connected to the long slot 31a. Accompanying the moving of the change lever 31 along the right or left direction, the pin 27 will move in the slot 1a and the rotating control lever 25 is driven to rotate. When the change lever 31 is driven to move along the A direction, from the state as shown in FIG. 4, the long slot 31a will not restrain the pin 27 and it is moved only along a straight line. Thus, the rotation control lever 25 cannot be driven. By means of the action of the change lever 31 along direction A, the mechanisms which are designed for the change of play mode and the change of fast-forward mode will be driven.

As shown in FIG. 1, a belt 41 is put on the transmission pulley 17. The belt 41 is also put on the driven pulley 42. This driven pulley 42 is supported by the axis 43 which is mounted on the chassis 1. The pulley 42 can rotate freely. At the underside of the driven pulley 42, a pinion gear is designed to form an integral unit with driven pulley 42, and a gear 44 is equipped to mesh with the pinion. The pinion as integral unit with the gear 44 meshes with gear 45, and the pinion as integral unit with the gear 45 meshes with the gear 46a. Further, the gear 46a is formed into an integral unit together with cassette driving gear 46. The gear 46a and the cassette driving gear 46 can rotate freely and are supported by the shaft 47 which is mounted on the chassis 1. The rotating force of the above-mentioned driven pulley 42 is reduced and transmitted through the gears 44 and 45 and used to drive the cassette driving gear 46. The relation of rotating direction of the cassette driving gear 45 and the capstan 3 is as follows. When the capstan 3 is rotating along direction (a), the cassette driving gear 46 will be rotating along direction (c); when the capstan 3 is rotating along direction (b), the cassette driving gear 46 will be rotating along direction (d). The pinch roller 33 is expressed by dot line in FIG. 1. The pinch roller 33 will move along the direction of the capstan 3 when the tape loading action is proceeded. In the play mode, the tape will be pressed tightly against the capstan 3 by the pinch roller 33.

FIG. 5 is a schematic side view, sighted from V direction of FIG. 1, showing the whole component unit. In FIG. 1, omission has been proceeded. As a whole component unit, on both sides of the chassis 1, the side panels 50 are mounted, as shown in FIG. 5. At the internal side of side panel 50, a cassette holder 51 is mounted. The cassette C is inserted from the left of the figure against the cassette holder 51. At both sides of the cassette holder 51, the slide pins 52 are mounted. The slide pin 52 is inserted into the guide slot 50a which is formed in the upside and downside directions of the side panel 50. Additionally, numeral 53 is an elastic control lever, and its front end is connected to the up surface of the cassette holder 51. Meanwhile, since the spring is acted by a elastic force which is shown at the bottom of the figure, by the above-mentioned elastic control lever 53 or the action of elastic control lever 53 and other push and press elastic components. The cassette holder 51 will suffer a action of push and press elastic force which along the direction of the chassis 1. Numeral 54 is a slider. On the slider 54, a long slot 54a with straight line shape is formed, and it is inserted to the pin 56 which is fixed on the side panel 50. Because of the guiding action of the long slot 54a, the slider 54 can reciprocate along the right and left direction as shown in the figure. On the slider 54, a crank shape driving slot 54b is formed. The above-mentioned slide pin 52 is inserted into the driving slot 54b. When the slider 54 moves to the left of the figure, the sliding pin 52 will be led downward of the figure by the driving slot 54b. The sliding pin 52 descends along the guide slot 50a and the cassette holder 51 descends to the chassis 1.

On the above-mentioned slider 54, a rack 58 is mounted. The rack 58 meshes with the above-mentioned cassette driving gear 46. When the above-mentioned cassette driving gear 46 is rotating, through the rack 58, the slider 54 will be driven reciprocately along the left and right direction of FIG. 5.

The motion as a whole is described as the following. As shown in FIG. 5, the cassette C is inserted from the left of the figure against the cassette holder 51. FIG. 5 shows the state that the cassette C has not been wholly inserted. The actual inserting motion is inserting the cassette into the cassette holder deeply. Once the cassette is completely inserted because the basic section of the cassette holder 51 is designed to be protruded, the slider lock C1 under the cassette C will be released, and through the inserting motion of the cassette, the slider C1 will be deviated backward. Then the tape reel inside the cassette C will be revealed from the bottom. The motion to insert the cassette C deeply into the cassette holder 51 can be completed by hand or by means of the pulling cassette C into the full depth of the cassette holder 51 by the power of the motor after cassette C is being inserted to a certain depth.

Once the cassette C is completely inserted, the change lever 31 as shown in FIG. 1 will move in direction to B. By the maintaining slot 31b as shown in FIG. 4, the pin 27 will be driven, and the rotation control lever 25 will be driven in counter clockwise direction. At the moment, the slope 25a on the rotating control lever 25 will lift the arm 24b, and then the change component 24 will be raised along the pin 23. If the change component 24 is raised, the clutch gear 16 will be raised by the arm 24a which is mounted on the change component 24. Then the projection 16a which is mounted on the clutch gear 16 will match with the projection 17a which mounted on the power transmission pulley 17. Because the clutch gear 16 is generally meshing with the driving gear 11, and the gear 11a which is under driving gear 11 and designed to be an integral unit with it, is generally meshing with the gear 9 at bottom of the capstan 3, the driving gear 11 will be rotated when the capstan 3 is driven by the motor M. Additionally, as mentioned above, if the clutch gear 16 is raised and the projection 16a meshes with the projection 17a, because the clutch gear 16 is raised under the condition of meshing with the driving gear 11, the power of the driving gear 11 will be transmitted from the clutch gear 16 to the power transmission pulley 17. In this situation, the raising of the clutch gear 16 does not occur when the capstan 3 is stopped. In most cases, the clutch gear 16 is lifted when the capstan 3 is rotating and also the clutch gear 16 is rotating. In this situation, the projection 16a of the rotating clutch gear 16 meshes the projection 17a of the power transmission pulley 17, the front end of such projections will occasionally run into each other. The upside spring 19 will be shrunk, and once the power transmission pulley 17 is lifted, the clutch gear 16 will begin to rotate. When the projection 16a meets the depression 17b and the depression 16b meets the projection 17a, the power transmission pulley 17 will be descended by the elastic pressure of the spring 19 and the projections 16a and 17a will mesh each other completely. Further, the projections 16a and 17a are all rectangular in shape, and no slope is formed at their front ends. If the slope is formed, between the meshing projections 16a and 17a, problems such as sliding, bouncing away from each other will be occurred and the meshing will become unreliable. Nevertheless, in above embodiment, since no slope is formed at the front ends of the projections 16a and 17a, they will not be bounced away from each other. The reliable meshing can be realized by force of the spring 19.

When the clutch gear 16 and the power transmission pulley 17 are mutually meshed with each other and the power of the capstan 3 is transmitted to the power transmission pulley 17, the power can be transmitted to the driven pulley 42 by the belt 41 and used to drive the cassette driving gear 46 after speed reduction by the gears 44 and 45. When the cassette C is being loaded, the capstan 3 is driven to rotate along the direction (a), and the cassette driving gear 46 is driven to rotate along the direction (C). At the moment, as shown in FIG. 5, the rack 58 which is meshing with the cassette driving gear 46 will be driven to move along direction to the left, the slider 54, which forms an integral unit with the rack 58, is driven to move along the left direction as shown in the figure. Subsequently, through the driving slot 54b which is formed on the slider 54, the slide pin 52 will be led to the descending direction. Thus, the cassette holder 51 will descend, and the cassette C, which is maintained inside the cassette holder 51 will be loaded to the tape driving section on chassis 1.

After the cassette is completely loaded, inside the component unit as shown in FIG. 1, the tape loading mechanism, which is not shown in the figure, begins its motion. The tape in the cassette is drawn out and wound on the rotating magnetic head device 2. At this moment, the change lever 31 moves toward the direction A, and the rotation control lever 25 stops at the position after rotating clockwise as shown in FIG. 4. Once, the rotation control lever 25 is driven to rotate clockwise, the arm 24b of the change component 24 will break away from the slope 25a on rotation control lever 25. Therefore, the clutch gear 16 will descend by the force of the spring 18, and the mutually meshing state of the projection 16a on the clutch gear 16 and the projection 17a on the power transmission pulley 17 will be released. The moving of the change lever 31 toward direction A is set up as the play mode, and the tape is pressed against the capstan 3 by the pinch roller 33. By this way, because of the rotating of the capstan 3, the tape is passing through. Meanwhile, because of the rotating of capstan 3, the driving gear 11 will be rotating continuously and the meshing clutch gear 16 will also be rotating continuously. However, as mentioned above, since the power transmission between the clutch gear 16 and the power transmission pulley 17 is cut off, the power transmission pulley 17 and the driven pulley 42 will all be stopped.

Secondly, in executing the eject motion of the cassette, after the tape, which is mounted on the rotating magnetic head device 2, has been stored in the cassette, the change lever 31 will move toward direction B. The rotation control lever 25 is driven to move along the counter clockwise direction. The change component 24 is raised, and the projection 16a on the clutch gear 16 meshes with the projection 17a on the power transmission pulley 17. At this moment, the capstan 3 is driven to rotate along direction (b) by the motor M. The power is transmitted to the driven pulley 42 through the clutch gear 16, the power transmission pulley 17 and the belt 41. After speed reduction by the gears 44 and 45, the cassette driving gear 46 is driven to rotate along the direction (d). Through the cassette driving gear 46, the rack 58 is driven to move along the right direction of the figure, and the slider 54 is driven to move along the right direction of FIG. 5. Therefore, through the driving slot 54b formed on slider 54, the sliding pin 52 will be guided upward and caused to lift the cassette holder 51 to the position where the cassette C can be ejected.

Further, in the embodiment as shown in the figure, the driving section of the cassette holder has been employed as shown in FIG. 5. However, the construction of the driving section is not only limited to that mentioned in this embodiment. For example, it is reasonable to adopt a construction that when inserting the cassette by means of moving rack driven by the power of the capstan, once the cassette holder is moving along the horizontal direction and then descends, the cassette will be loaded to the tape driving section on the chassis 1.

Still further, in the embodiment as shown in the figure, although the direct transmission method, in which the capstan is directly rotated by motor M, is expressed, yet, even by employing the construction such as to transmit the power of the motor to the capstan by means of belt or others, this design can also be realized.

If this design mentioned above is employed, the load and eject of the cassette can be accomplished by the power of the capstan. Therefore, the motor equipped for load and eject the cassette becomes unnecessary. The conception of decreasing number of motors required, the size, and the weight can all be realized. Secondly, in execution of load and eject of the cassette, generally the capstan motor is not employed. Intricate timing for the tape loading motion and the motion of load and eject of the cassette becomes unnecessary when the tape loading motor is employed to execute the load and eject motion of the cassette, just like that employed in former technique. Therefore the purification of the mechanism and the simplification of the control can all be realized.

Further, in this design, the driving gear and the clutch gear, which are simultaneously driven with the capstan, are generally meshed with each other. Since the clutch gear is coupled to the power transmission rotator under this meshing state, the procedure of power transmission and the loading of the motor are much more stable in comparison to the change mechanism which employs the contact or separation of the gears to transmit power.

What is claimed is:

1. A cassette loading device for a tape player equipped with a capstan driven by a motor, and a pinch roller for pressing a tape against the capstan, comprising:
   (a) a driving gear rotated by said motor;
   (b) a clutch gear and a power transmission rotator which are independently supported on a common shaft, said clutch gear being coupled to said driving gear for rotation;
   (c) projections formed on said clutch gear and on said power transmission rotator which are interlockingly meshable with each other;
   (d) a spring which exerts a separating force between said clutch gear and said power transmission rotator and biases said projections towards an unmeshed position;
   (e) a cassette holder driving section for positioning a cassette from an initial loading position to a tape driving position by a forward rotation of said power transmission rotator and for positioning the cassette from the tape driving position to the initial loading position by a reverse rotation of said power transmission rotator;

(f) a speed reducing means for coupling power from said power transmission rotator to the cassette holder driving section; and (g) a change component for moving said clutch gear along said common shaft toward said power transmission rotator to interlockingly mesh said projections on said clutch gear with said projections on said power transmission rotator and couple power from said motor to said cassette holder driving section to move the cassette between the initial loading position and the tape driving position.

2. A cassette loading device for a tape player equipped with a capstan driven by a motor, and a pinch roller for pressing a tape against the capstan, comprising:

(a) a driving gear rotated by said motor;

(b) a clutch gear and a power transmission rotator which are independently supported on a common shaft, said clutch gear being coupled to said driving gear for rotation;

(c) projections formed on said clutch gear and on said power transmission rotator which are interlockingly meshable with each other;

(d) a coil spring, disposed at least partly between said clutch gear and said power transmission rotator, for exerting a separating force between said clutch gear and said power transmission rotator and biasing said projections towards an unmeshed position;

(e) cassette holder driving section for positioning a cassette from an initial loading position to a tape driving position by a forward rotation of said power transmission rotator and for positioning the cassette from the tape driving position to the initial loading position by a reverse rotation of said power transmission rotator;

(f) a speed reducing means for coupling power from said power transmission rotator to the cassette holder driving section; and (g) a change component for moving said clutch gear along said common shaft toward said power transmission rotator to interlockingly mesh said projections on said clutch gear with said projections on said power transmission rotator and couple power from said motor to said cassette holder driving section to move the cassette between the initial loading position and the tape driving position.

* * * * *